US012807159B2

(12) United States Patent
Watanabe

(10) Patent No.: US 12,807,159 B2
(45) Date of Patent: Nov. 24, 2026

(54) OPERATION MANAGEMENT DEVICE AND MaaS PROVIDING METHOD

(71) Applicant: TOYOTA JIDOSHA KABUSHIKI KAISHA, Toyota (JP)

(72) Inventor: Katsuhiro Watanabe, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/921,005

(22) Filed: Oct. 21, 2024

(65) Prior Publication Data

US 2025/0229784 A1 Jul. 17, 2025

(30) Foreign Application Priority Data

Jan. 17, 2024 (JP) ................................ 2024-005502

(51) Int. Cl.
*B60W 30/182* (2020.01)
*B60W 60/00* (2020.01)

(52) U.S. Cl.
CPC ...... *B60W 30/182* (2013.01); *B60W 60/0053* (2020.02); *B60W 2556/10* (2020.02); *B60W 2556/40* (2020.02)

(58) Field of Classification Search
CPC ............... B60W 30/182; B60W 60/00; B60W 60/0053; B60W 2556/10; B60W 2300/00; B60W 2556/00; B60W 2556/40; G05D 1/0061; G05D 1/0088; G05D 1/021; G05D 1/0214; G05D 1/0221; G05D 1/0223
USPC ........................................................... 701/23
See application file for complete search history.

(56) References Cited

U.S. PATENT DOCUMENTS

2016/0012724 A1* 1/2016 Ahiko ...................... G08G 1/13 340/994
2020/0064833 A1* 2/2020 Fox .................. B60W 60/0057
2020/0126427 A1* 4/2020 Civitella ................ G01C 21/30
2021/0286359 A1* 9/2021 Della Penna .......... G06V 20/58
2023/0141127 A1* 5/2023 Yu ........................... G08G 1/22 701/23
2024/0044656 A1* 2/2024 Schmitt ................ G01C 21/343
2024/0083297 A1* 3/2024 Nagata .................... B60L 58/12
2024/0317255 A1* 9/2024 Mocherla ............ B60W 60/001

FOREIGN PATENT DOCUMENTS

JP 2023-132714 A 9/2023

* cited by examiner

*Primary Examiner* — Erin M Piateski
*Assistant Examiner* — David Mesquiti Ovalle
(74) *Attorney, Agent, or Firm* — SoraIP, Inc.

(57) ABSTRACT

The operation management device includes a control unit. The control unit acquires: map data indicating the first identifier and the latitude and longitude of each stop included in the route for operating one or more automated driving vehicle; in association with the second identifier and the latitude and longitude of each stop, the schedule data indicating the operation schedule of each stop; and characteristic data indicating a characteristic of a road around each stop in association with the first identifier of each stop. The control unit compares the latitude and longitude of the acquired map data with the latitude and longitude of the acquired timetable data, and associates the first identifier of the map data with the second identifier of the timetable data. The control unit determines an operation plan of the one or more automated driving vehicles. The operation plan includes a change of the driving mode.

10 Claims, 5 Drawing Sheets

50

| NUMBER | LONGITUDE | LATITUDE |
|---|---|---|
| 1 | 148° 45′ 08″ | 45° 33′ 26″ |
| 2 | 122° 55′ 57″ | 24° 27′ 05″ |
| 3 | 136° 04′ 11″ | 20° 25′ 31″ |
| 4 | 153° 59′ 12″ | 24° 16′ 59″ |

FIG. 5

70

| NUMBER | PROPERTIES |
|---|---|
| 1 | CROSS-BORDER PLANTING |
| 2 | — |
| 3 | — |
| 4 | NARROW ROAD |

OPERATION MANAGEMENT DEVICE AND MaaS PROVIDING METHOD

CROSS-REFERENCE TO RELATED APPLICATION

This application claims priority to Japanese Patent Application No. 2024-005502 filed on Jan. 17, 2024, incorporated herein by reference in its entirety.

BACKGROUND

1. Technical Field

The present disclosure relates to an operation management device and a MaaS providing method.

2. Description of Related Art

Japanese Unexamined Patent Application Publication No. 2023-132714 (JP 2023-132714 A) discloses an operation management system that predicts occurrence of incidents on a road during operation of an automated driving vehicle, and updates a recommended speed set for the road in accordance with results of the prediction.

SUMMARY

In a conventional system, measures against occurrence of incidents on a road while one or more automated driving vehicles are being driven are insufficient.

It is an object of the present disclosure to improve measures against occurrence of incidents on a road while one or more automated driving vehicles are being driven.

An operation management device according to the present disclosure includes a control unit that

- acquires map data indicating a first identifier, and latitude and longitude of each stop included in a route for operating one or more automated driving vehicles,
- acquires timetable data indicating an operation timetable for each stop, in correlation with a second identifier, and latitude and longitude of each stop,
- acquires characteristics data indicating characteristics of roads in surroundings of each stop, in correlation with the first identifier of each stop,
- compares the latitude and longitude of the map data that is acquired with latitude and longitude of the timetable data that is acquired, and associates the first identifier of the map data and the second identifier of the timetable data, and
- decides an operation plan of the one or more automated driving vehicles including a change in a driving mode in one or more sections in the route, based on an operation timetable corresponding to each second identifier of the timetable data and characteristics corresponding to the first identifier associated with each second identifier of the characteristics data.

According to the present disclosure, measures against occurrence of incidents on a road while one or more automated driving vehicles are in operation can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram illustrating an example of characteristic data according to an embodiment of the present disclosure.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
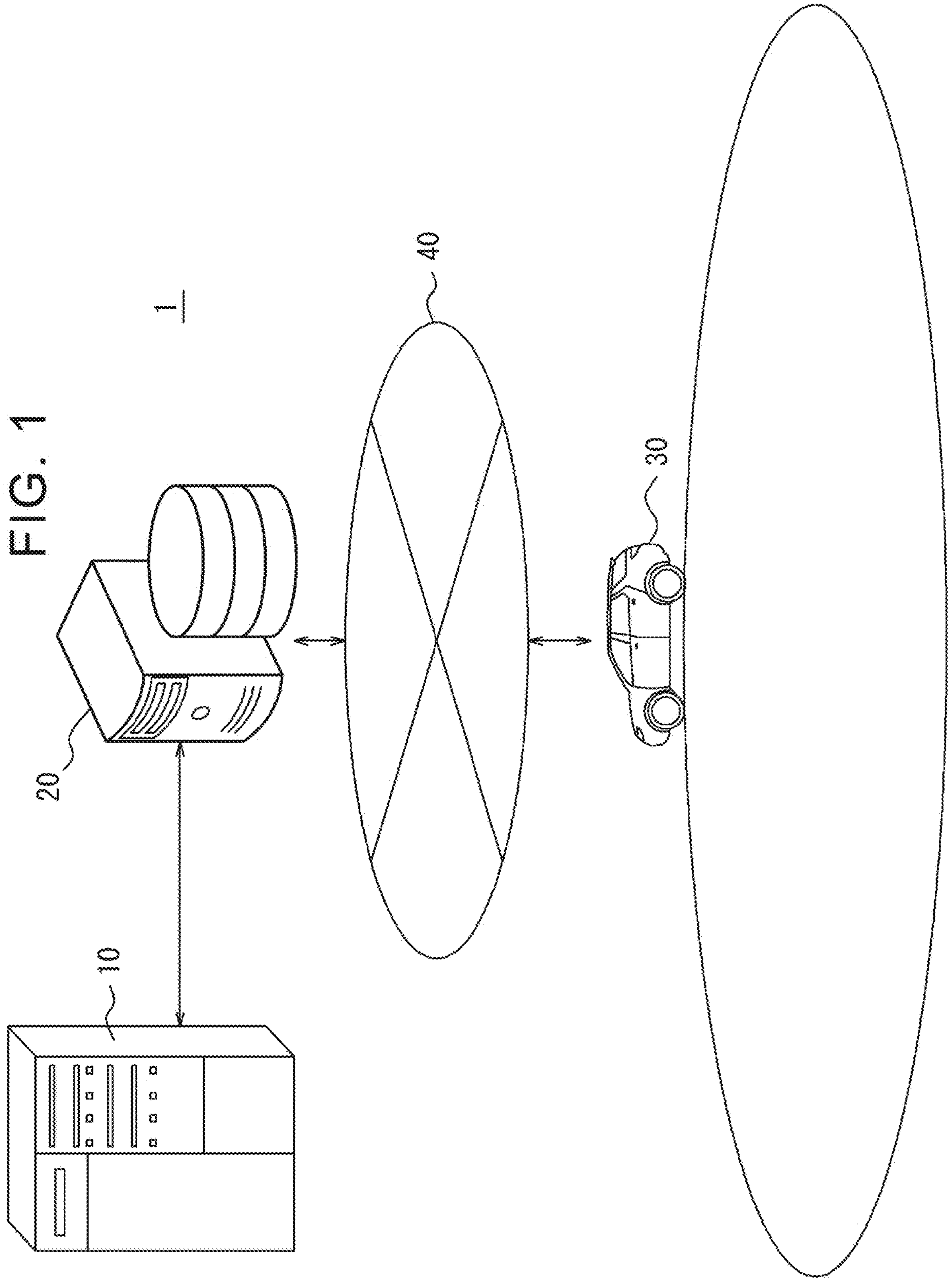
FIG. 1 is a diagram illustrating a configuration of a system according to an embodiment of the present disclosure.

A configuration of the system 1 according to the present embodiment will be described with reference to FIG. 1.

The system 1 according to the present embodiment includes an operation management device 10, an automated driving control device 20, and one or more automated driving vehicles 30. The operation management device 10 is communicably connected to the automated driving control device 20. The automated driving control device 20 is capable of communicating with one or more automated driving vehicles 30 via a network 40. The operation management device 10 may be capable of communicating with the automated driving control device 20 via the network 40.

The operation management device 10 is installed in a facility such as a data center. The operation management device 10 is a computer such as a server belonging to a cloud computing system or other computing system. The operation management device 10 is operated by an operation management business operator.

The automated driving control device 20 is installed in a facility such as a data center. The automated driving control device 20 is a computer such as a server belonging to a cloud computing system or another computing system. The automated driving control device 20 is operated by an operation management business operator.

The one or more automated driving vehicles 30 may be any type of vehicle, such as, for example, a gasoline-powered vehicle, a diesel-powered vehicle, a hydrogen-powered vehicle, an HEV, PHEV, BEV, or an FCEV. The term "HEV" is an abbreviation for hybrid electric vehicle. The term "PHEV" is an abbreviation for plug-in hybrid electric vehicle. The term "BEV" is an abbreviation for battery electric vehicle. The term "FCEV" is an abbreviation for fuel cell electric vehicle. One or more of the automated driving vehicles 30 are AV in the present embodiment, and the driving is automated at a high level. The term "AV" stands for autonomous vehicle. The level of automation is, for example, either level 3 or level 4 in the level division of SAE, but may be switchable to level 2 or less. The term "SAE" is an abbreviation for Society of Automotive Engineers. ODD are defined for one or more of the automated driving vehicles 30. The term "ODD" is an abbreviation for Operational Design Domain (operation designing area). The one or more automated driving vehicles 30 may be MaaS dedicated vehicles. The term "MaaS" is an abbreviation for Mobility as a Service.

The network 40 includes the Internet, at least one WAN, at least one MAN, or any combination thereof. The term "WAN" is an abbreviation for wide area network. The term "MAN" is an abbreviation for metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 1.

Figures 3, 4:
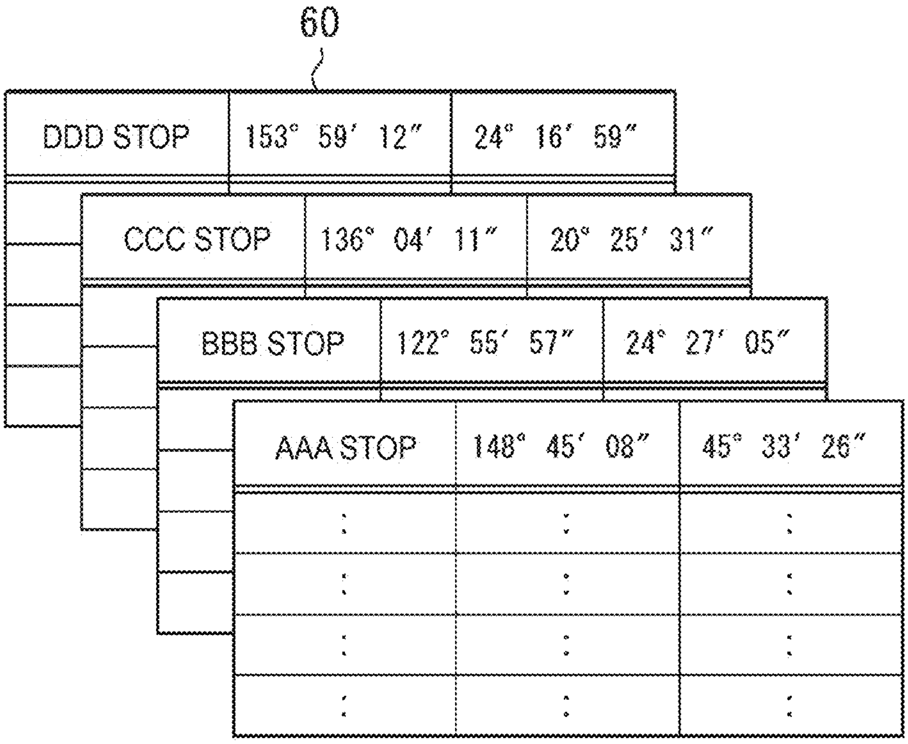
FIG. 3 is a diagram illustrating an example of map data according to an embodiment of the present disclosure.
FIG. 4 is a diagram illustrating an example of timetable data according to an embodiment of the present disclosure.

The operation management device 10 acquires the map data 50 indicating the first identifier and the latitude and longitude of each stop included in the route for operating the one or more automated driving vehicles 30 as illustrated in FIG. 3. The operation management device 10 acquires, in correlation with the second identifier and the latitude and longitude of each stop, the timetable data 60 indicating the operation timetable of each stop as illustrated in FIG. 4. The operation management device 10 acquires characteristic data 70 indicating characteristics of roads in the vicinity of each stop in correlation with the first identifier of each stop as illustrated in FIG. 5. The operation management device 10 compares the acquired latitude and longitude of the map data 50 with the acquired latitude and longitude of the timetable data 60, and associates the first identifier of the map data 50 with the second identifier of the timetable data 60. The operation management device 10 determines the operation plan of the one or more automated driving vehicles 30 based on the operation timetable corresponding to each second identifier of the timetable data 60 and the characteristic of the characteristic data 70 corresponding to the first identifier associated with each second identifier. The operation plan includes a change of the driving mode in one or more sections in the route.

According to the present embodiment, it is possible to improve countermeasures against occurrence of an accident on a road while one or more automated driving vehicles 30 are in operation.

In one embodiment, the operation management device 10 may be used to provide a MaaS that is a service that utilizes mobility.

Figure 2:
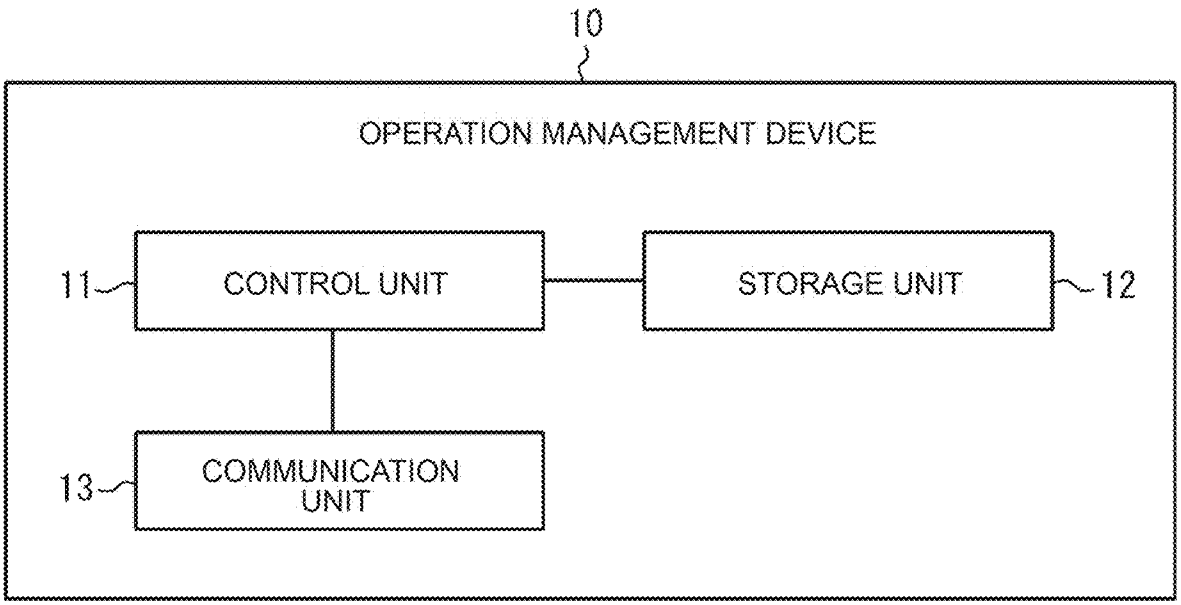
FIG. 2 is a block diagram illustrating a configuration of an operation management device according to an embodiment of the present disclosure.

A configuration of the operation management device 10 according to the present embodiment will be described with reference to FIG. 2.

The operation management device 10 includes a control unit 11, a storage unit 12, and a communication unit 13.

The control unit 11 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 11 executes processing related to the operation of the operation management device 10 while controlling each unit of the operation management device 10.

The storage unit 12 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The flash memory is, for example, an SSD. The term "SSD" is an abbreviation for solid-state drive. The magnetic memory is, for example, an HDD. The term "HDD" is an abbreviation for hard disk drive. The storage unit 12 may function as, for example, a main storage device, an auxiliary storage device, or a cache memory. The storage unit 12 stores data used for the operation of the operation management device 10 and data obtained by the operation of the operation management device 10.

The communication unit 13 includes at least one communication module. The communication module is, for example, a module compliant with a wired LAN communication standard such as Ethernet (registered trademark), a wireless LAN communication standard such as IEEE802.11, or a mobile communication standard such as LTE, 4G standard or 5G standard. The term "IEEE" is an abbreviation for Institute of Electrical and Electronics Engineers. The term "LTE" is an abbreviation for "long term evolution". The term "4G" is an abbreviation for "fourth generation". The term "5G" is an abbreviation for "fifth generation". The communication unit 13 communicates with one or more automated driving vehicles 30 via the network 40. The communication unit 13 receives data used for the operation of the operation management device 10 and transmits data obtained by the operation of the operation management device 10.

The function of the operation management device 10 is realized by executing the program according to the present embodiment by a processor serving as the control unit 11. That is, the functions of the operation management device 10 are realized by software. The program causes the computer to function as the operation management device 10 by causing the computer to execute the operation of the operation management device 10. That is, the computer functions as the operation management device 10 by executing the operation of the operation management device 10 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the process of the computer corresponds to the "data equivalent to a program".

Some or all of the functions of the operation management device 10 may be realized by a programmable circuit or a dedicated circuit as the control unit 11. That is, some or all of the functions of the operation management device 10 may be realized by hardware.

Figure 6:
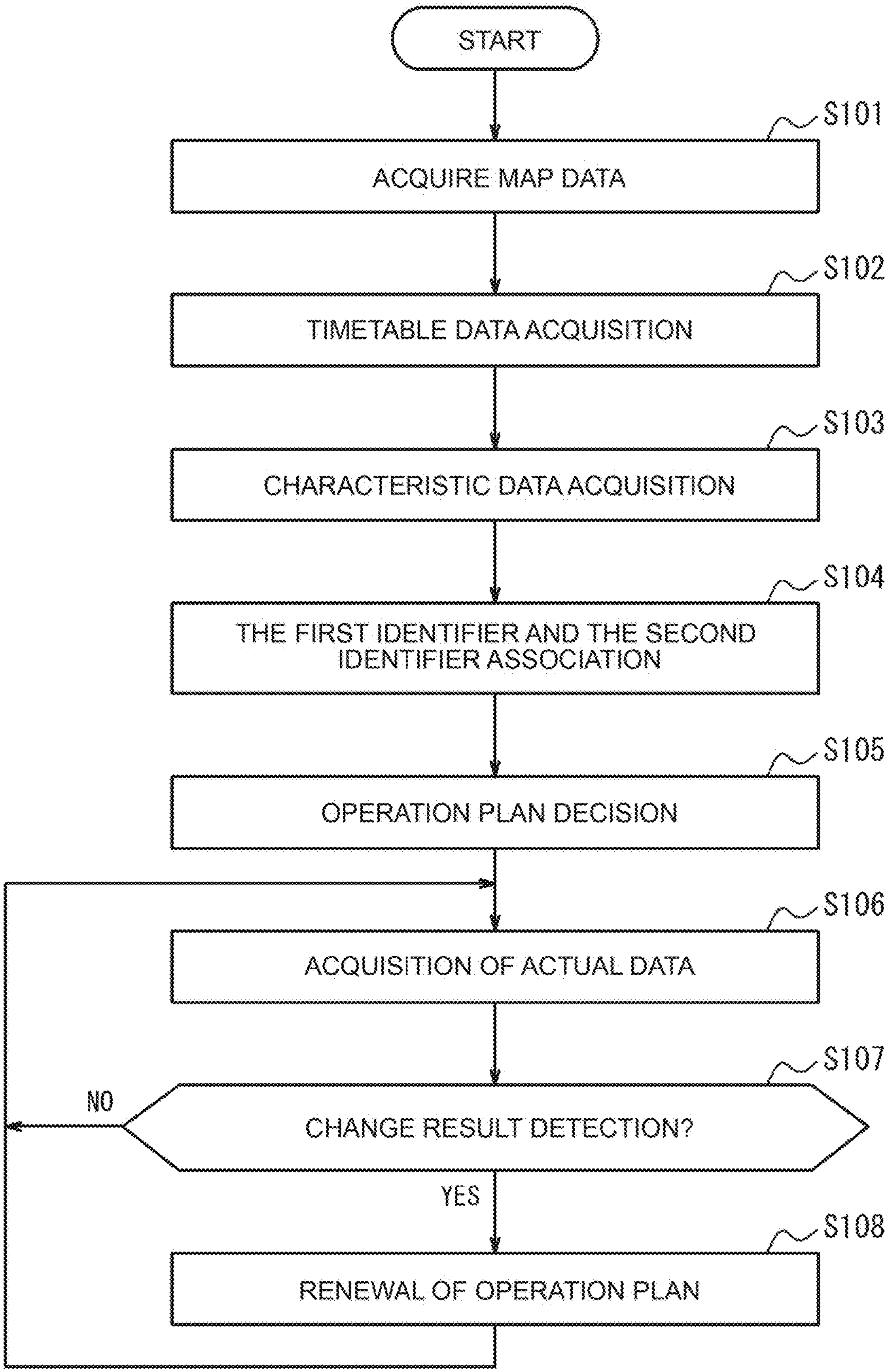
FIG. 6 is a flowchart illustrating an operation of the operation management device according to the embodiment of the present disclosure.

The operation of the operation management device 10 according to the present embodiment will be described with reference to FIG. 6. The operation described below corresponds to the operation management method according to the present embodiment. That is, the operation control methods according to the present embodiment include S108 steps from S101 shown in FIG. 6.

In S101, the control unit 11 of the operation management device 10 acquires the map data 50 indicating the first identifiers and the latitude and longitude of the respective stops included in the route for operating the one or more automated driving vehicles 30. This route is a route included in ODD. As a method of acquiring the map data 50, any method can be adopted, but in the present embodiment, the following method is adopted. The one or more automated driving vehicles 30 travel on a route scheduled for operation prior to the operation, and acquire route data. The route data includes a moving image captured by a camera attached to the vehicle, information around the route acquired from a sensor attached to the vehicle, a first identifier of each stop, and latitude and longitude of each stop acquired by GPS receiver attached to the vehicle. The term "GPS" is an abbreviation for Global Positioning System. The one or more automated driving vehicles 30 transmit the acquired route data to the automated driving control device 20. The automated driving control device 20 receives route data. The automated driving control device 20 transmits the received route data to the operation management device 10. The control unit 11 of the operation management device 10 receives route data via the communication unit 13. The control unit 11 acquires, as the map data 50, data indicating the first identifier and the latitude and longitude of each stop included in the route included in the received route data. In the example of FIG. 3, the first identifiers numbered 1 to 4 are assigned to the four stops. In the map data 50 of this example, the number of the stop is associated with the latitude and longitude of the stop.

In S102, the control unit 11 of the operation management device 10 acquires the timetable data 60 indicating the operation schedule of each stop in association with the second identifier and the latitude and longitude of each stop. As a method of acquiring the timetable data 60, any method can be adopted, but in the present embodiment, the following method is adopted. The operation management business operator assigns the second identifier to each stop, and registers, in the operation management device 10, data in which the operation timetable of each stop is associated with the second identifier of each stop and the latitude and longitude of each stop acquired by a method different from the route data. The control unit 11 acquires the registered data as the timetable data 60. In the example of FIG. 4, the name of the stop, which is the second identifier, is given to the four stops. In the timetable data 60 of this example, the name of the stop, the latitude and longitude of the stop, and the operation schedule of the stop are associated with each other.

In S103, the control unit 11 of the operation management device 10 acquires the characteristic data 70 indicating the characteristic of the road around each stop in association with the first identifier of each stop. As a method of acquiring the characteristic data 70, any method can be adopted, but in the present embodiment, the following method is adopted. The control unit 11 determines the characteristics of the roads around the respective stopping stations from the moving images and the information around the routes included in the route data received by S101. The control unit 11 acquires, as the characteristic data 70, data in which the determined characteristic is associated with the first identifier of each stop included in the route data. In the example of FIG. 5, a number that is the first identifier is assigned to the four stop stations. In the timetable data 60 of this example, "road width is narrow" is associated with the stop of No. 1 as a characteristic "cross-border" and the stop of No. 4 as a characteristic.

In S104, the control unit 11 of the operation management device 10 compares the latitude and longitude of the map data 50 acquired by S101 with the latitude and longitude of the timetable data 60 acquired by S102, and associates the first identifier of the map data 50 with the second identifier of the timetable data 60. In the exemplary embodiments of FIGS. 3 and 4, the control unit 11 associates the number 1 of the map data 50 with AAA stop of the timetable data 60 from the latitude and longitude "148°45'08" and 45° 33'26"". The control unit 11 associates the number 2 of the map data 50 with BBB stop of the timetable data 60 from the latitude and longitude "122°55'57" and 24° 27'05"". The control unit 11 associates the number 3 of the map data 50 with CCC stop of the timetable data 60 from the latitude and longitude "136° 04'11" and 20° 25'31"". The control unit 11 associates the number 4 of the map data 50 with DDD stop of the timetable data 60 from the latitude and longitude "153°59'12" and 24°16'59"".

In S105, the control unit 11 of the operation management device 10 determines the operation plan of the one or more automated driving vehicles 30 on the basis of the operation schedule corresponding to each second identifier of the timetable data 60 and the characteristic of the characteristic data 70 corresponding to the first identifier associated with each second identifier. The operation plan includes a change of the driving mode in one or more sections in the route. Specifically, the control unit 11 determines the operation plan of the one or more automated driving vehicles 30 including switching to manual driving in one or more sections based on the operation schedule and the characteristic. Alternatively, the control unit 11 determines the operation plan of the one or more automated driving vehicles 30 including the change of the automated driving level in the one or more sections based on the operation schedule and the characteristic. The control unit 11 transmits the determined operation plan to the automated driving control device 20 via the communication unit 13. The automated driving control device 20 receives the operation plan. The automated driving control device 20 transmits the received operation plan to one or more automated driving vehicles 30. The one or more automated driving vehicles 30 operate according to the received operation plan. For example, the control unit 11 determines the operation plan to switch the section where the planting in the roads around AAA stop is crossing to the manual driving, based on AAA stop of the timetable data 60 and the characteristics of the characteristic data 70 that are crossing the planting boundary. Based on DDD stop of the timetable data 60 and the narrow road width characteristic of the characteristic data 70, the control unit 11 determines an operation plan so as to reduce the automated driving level of the section where the road width is narrow in the road around DDD stop by one.

After S105, S106 and subsequent processes are performed. S106 and subsequent processes are performed once a day in the present embodiment, but may be performed once every six hours, once every three days, or at any other intervals.

In S106, the control unit 11 of the operation management device 10 acquires actual results indicating the operation results of the one or more automated driving vehicles 30. Operation results include the number of times the automated driving level is changed during operation and the section, or the number of times the switching to the manual operation is performed and the section. More specifically, the one or more automated driving vehicles 30 generate actual results data during operation. The one or more automated driving vehicles 30 transmit the generated actual results data to the automated driving control device 20. The automated driving control device 20 receives the actual data. The automated driving control device 20 transmits the received result data to the operation management device 10. The control unit 11 of the operation management device 10 receives the actual data via the communication unit 13.

In S107, the control unit 11 of the operation management device 10 detects, as the change result, a result that the switching to the manual driving not included in the operation plan is performed in at least one section of the route or a result that the automated driving level not included in the operation plan is changed. The actual results are included in the operation results indicated by the actual results acquired by S106. For example, the control unit 11 detects, as a change result, a result that the switching to the manual driving is performed four times on the road around the stop of the number 2. Alternatively, the control unit 11 detects, as a change result, a result that the change to one level lower than the automated driving level is performed 10 times on the road around the stop of the number 3.

After S107, S108 is processed. However, when the change result is not detected in S107, S106 process is performed again. In the present embodiment, the control unit 11 proceeds to S108 when the change result is detected one or more times, but may set a criterion to the number of times of detection for proceeding to S108. For example, the control unit 11 may not proceed to S108 even if the track record that the switching to the manual driving has been performed four times is detected as the change result on the roads in the vicinity of the stop of the number 2. The control unit 11 may proceed to S108 only when the track record that the switching to the manual driving was performed five times or more is detected as the change track record on the roads in the vicinity of the stop of the number 2. Alternatively, the control unit 11 may not proceed to S108 even if it detects, as a change result, a result that a change to one of the automated driving levels is performed ten times on the roads in the vicinity of the stop of the number 3. The control unit 11 may proceed to S108 only when a track record that the change to one lower of the automated driving level was performed 11 or more times is detected as the change result in the road around the stop of the number 3.

In S108, the control unit 11 of the operation management device 10 updates the operation plan to include, in the operation plan, a change to the manual driving in at least one section, which is the same as the change result detected by S107, or a change in the automated driving level. The control unit 11 transmits the updated operation plan to the automated driving control device 20 via the communication unit 13. The automated driving control device 20 receives the operation plan. The automated driving control device 20 transmits the received operation plan to one or more automated driving vehicles 30. The one or more automated driving vehicles 30 operate according to the received operation plan. For example, the control unit 11, based on the result that the switching to the manual driving on the road in the vicinity of the stop of the number 2 was performed four times, updating the operation plan to switch to the manual driving in the same section in the road in the vicinity of the stop of the number 2. The control unit 11 updates the operation plan so as to reduce the automated driving level of the same section in the road around the stop of the number 3 by one based on the result that the change of the automated driving level to 1 is performed 10 times on the road around the stop of the number 3. In the present embodiment, the operation based on the operation plan updated from the next day is performed.

After S108, the control unit 11 performs a S106 process.

In the present embodiment, when the operation plan is determined and updated, the control unit 11 includes the change of the driving mode in the specific section in the operation plan, but may instead change the route itself to avoid the specific section. For example, the control unit 11 may determine the operation plan on the basis of AAA stop of the timetable data 60 and the characteristic of the cross-border of the characteristic data 70 in S105. In this operation planning, the one or more automated driving vehicles 30 do not pass through the section where the planting in the roadway around AAA stop is crossing. Alternatively, the control unit 11 may update the operation plan on the basis of the result that the switching to the manual driving is performed four times on the roadway in the vicinity of the stop of the number 2 in S108. In the updated operation plan, one or more automated driving vehicles 30 do not pass through the same section of the road around the stop of the number 2 from the next day.

The automated driving control device 20 may be integrated with the operation management device 10. The control unit 11 of the operation management device 10 may receive the route data from the one or more automated driving vehicles 30 by S101. The control unit 11 of the operation management device 10 may transmit the operation plan to the one or more automated driving vehicles 30 in S105. The control unit 11 of the operation management device 10 may receive the actual results from the one or more automated driving vehicles 30 in S106. The control unit 11 of the operation management device 10 may transmit the operation plan to the one or more automated driving vehicles 30 in S108.

In one embodiment, the process may be performed in providing a MaaS using one or more automated driving vehicles 30. In this case, the information processing method according to the above-described processing procedure is an exemplary providing method a service (MaaS) using one or more automated driving vehicles 30.

As described above, in the present embodiment, the control unit 11 of the operation management device 10 acquires the map data 50 indicating the first identifier and the latitude and longitude of each of the stop stations included in the route for operating the one or more automated driving vehicles 30. The control unit 11 of the operation management device 10 acquires the timetable data 60 indicating the operation schedule of each stop in association with the second identifier and the latitude and longitude of each stop. The control unit 11 of the operation management device 10 acquires the characteristic data 70 indicating the characteristics of the roads in the vicinity of each stop in association with the first identifier of each stop. The control unit 11 of the operation management device 10 compares the acquired latitude and longitude of the map data 50 with the acquired latitude and longitude of the timetable data 60, and associates the first identifier of the map data 50 with the second identifier of the timetable data 60. The control unit 11 of the operation management device 10 determines the operation plan of the one or more automated driving vehicles 30 based on the operation schedule corresponding to each second identifier of the timetable data 60 and the characteristic of the characteristic data 70 corresponding to the first identifier associated with each second identifier. The operation plan includes a change of the driving mode in one or more sections in the route.

According to the present embodiment, it is possible to improve countermeasures against occurrence of an accident on a road while one or more automated driving vehicles 30 are in operation.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. An operation management device comprising;

a processor; and a memory storing executable instructions that cause the processor to acquire map data indicating a first identifier (number listing), and a latitude and a longitude of each stop included in a route for operating one or more automated driving vehicles, acquire timetable data indicating an operation timetable for each stop, the timetable data being correlated with a second identifier (stop name), and the latitude and the longitude of each stop, acquire characteristics data indicating characteristics of roads surrounding each stop, the characteristics data being correlated with the first identifier of each stop, compare the latitude and the longitude of the acquired map data with the latitude and the longitude of the acquired timetable data, and associate the first identifier of the map data and the second identifier of the timetable data, and determines an operation plan of the one or more automated driving vehicles, the operation plan including instructions to switch a driving mode in one or more sections in the route, based on an operation timetable corresponding to each second identifier of the timetable data and characteristics corresponding to the first identifier associated with each second identifier of the characteristics data transmits the operation plan to the one or more automated driving vehicles via a communications network, wherein the automated driving vehicles switch the driving mode in accordance with the operation plan when traveling in the one or more sections along the route.

2. The operation management device according to claim 1, wherein the switching of the driving mode in the one or more sections includes switching to a manual operation mode in at least one of the one or more sections.

3. The operation management device according to claim 2, wherein the executable instructions further cause the processor to acquire record data that includes an operation record of the one or more automated driving vehicles, wherein when the processor detects that the operation record of the acquired record data includes a change record indicating that a switch to manual driving has occurred that was not included in the operation plan; and the switch to manual driving occurred in at least one section of the route included in the operation record, the processor updates the operation plan to include switching to the manual operation mode in the at least one section.

4. The operation management device according to claim 1, wherein the switching of the driving mode in the one or more sections includes switching to an automated driving level in at least one of the one or more sections.

5. The operation management device according to claim 4, wherein the executable instructions further cause the processor to acquire record data that includes an operation record of the one or more automated driving vehicles, wherein when the processor detects that the operation record of the acquired record data includes a change record indicating that a switch in the automated driving level has occurred that was not included in the operation plan; and the switch in the automated driving level occurred in at least one section of the route included in the operation record, the processor updates the operation plan to include switching the automated driving level in the at least one section.

6. A method of providing Mobility as a Service (MaaS) using the operation management device according to claim 1.

7. The operation management device according to claim 1, wherein the characteristics data includes the characteristics of the roads around each stop detected by a sensor installed on the automated driving vehicle.

8. The operation management device according to claim 7, wherein the characteristics data includes the characteristics of the roads around each stop captured as moving image data by a camera installed on the automated driving vehicle.

9. The operation management device according to claim 1, wherein the determining of the operation plan of the one or more automated driving vehicles is determined by the processor at six-hour intervals.

10. The operation management device according to claim 1, wherein the determining of the operation plan of the one or more automated driving vehicles is determined by the processor at three-day intervals.

* * * * *